(12) United States Patent
Ferrell et al.

(10) Patent No.: US 11,891,191 B2
(45) Date of Patent: Feb. 6, 2024

(54) AIRPORT FREIGHT AND CARGO TRANSFER SYSTEM

(71) Applicant: Borealis Technical Limited, North Plains, OR (US)

(72) Inventors: Stuart Mark Ferrell, Burnsville, MN (US); William T. Reed, New York, NY (US); Joseph J. Cox, Portland, OR (US)

(73) Assignee: Borealis Technical Limited, Isle of Man (IM)

( * ) Notice: Subject to any disclaimer, the term of this patent is extended or adjusted under 35 U.S.C. 154(b) by 97 days.

(21) Appl. No.: 17/459,596

(22) Filed: Aug. 27, 2021

(65) Prior Publication Data

US 2022/0063807 A1 Mar. 3, 2022

Related U.S. Application Data

(60) Provisional application No. 63/071,267, filed on Aug. 27, 2020.

(51) Int. Cl.
*B64C 9/00* (2006.01)
*B64D 9/00* (2006.01)

(52) U.S. Cl.
CPC ........ *B64D 9/003* (2013.01); *B64D 2009/006* (2013.01)

(58) Field of Classification Search
CPC . B64F 1/322; B64F 1/32; B64F 1/305; B64D 9/003; B64D 2009/006
USPC ...................................... 244/137.1
See application file for complete search history.

(56) References Cited

U.S. PATENT DOCUMENTS

| | | | | |
|---|---|---|---|---|
| 3,595,407 A | * | 7/1971 | Muller-Kuhn | B64F 1/322 294/67.1 |
| 3,727,581 A | * | 4/1973 | Brent | A01K 1/0236 244/137.1 |
| 5,101,962 A | * | 4/1992 | Pritchard | B64D 9/00 198/782 |

(Continued)

FOREIGN PATENT DOCUMENTS

FI 2007042609 A1 4/2007

OTHER PUBLICATIONS

Patent Appln No. GB2112335.1: Combined Search and Examination Report dated Apr. 22, 2022.

*Primary Examiner* — Christopher D Hutchens

(57) ABSTRACT

A system and a method are provided for safely and efficiently transferring cargo and freight packed in ULD containers directly between an airport freight terminal and freight aircraft. An enclosed freightway is designed to provide a direct connection between the freight terminal and aircraft cargo doors. The enclosed freightway is structured and sized to move ULD containers automatically or manually between freight aircraft and freight terminals. Different freightway configurations enable direct connection between the freight terminal and freight aircraft main cargo door when freight aircraft are driven by electric taxi drive systems or aircraft engines and parked in nose-in orientations and when freight aircraft are driven by electric taxi drive systems and parked in parallel orientations at the freight terminal. An alternative embodiment provides direct connections between freight aircraft cargo doors and interior loading docks for aircraft driven with electric taxi drive systems.

13 Claims, 4 Drawing Sheets

(56) References Cited

U.S. PATENT DOCUMENTS

| | | |
|---|---|---|
| 6,659,704 B2 | 12/2003 | Fukuhara et al. |
| 9,452,901 B2 | 9/2016 | Panzram et al. |
| 10,308,352 B2 | 6/2019 | Cookman et al. |
| 2002/0164236 A1 | 11/2002 | Fukuhara et al. |
| 2003/0021660 A1 | 1/2003 | Wells |
| 2005/0253021 A1 | 11/2005 | McCoskey |
| 2010/0213313 A1* | 8/2010 | Reed ........................ B64D 9/00 244/118.1 |
| 2011/0215198 A1* | 9/2011 | Panzram ................ B64D 9/003 244/118.1 |
| 2012/0312926 A1* | 12/2012 | Holzner ................... B64D 9/00 244/137.1 |
| 2014/0326574 A1* | 11/2014 | Kalitta ................. B65G 39/025 193/35 MD |
| 2014/0377043 A1* | 12/2014 | Panzram ................. B64D 9/00 414/809 |
| 2017/0349263 A1* | 12/2017 | Lopez .................... B64F 1/322 |
| 2018/0111689 A1* | 4/2018 | Huber ....................... B64F 5/10 |
| 2019/0308725 A1* | 10/2019 | Sherman ............... B64D 9/003 |

\* cited by examiner

AIRPORT FREIGHT AND CARGO TRANSFER SYSTEM

TECHNICAL FIELD

The present invention relates generally to freight and cargo transfer and handling systems at airports and specifically to a freight and cargo transfer system useful to transfer containerized freight between an airport freight handling facility and dedicated freight transport aircraft.

BACKGROUND OF THE INVENTION

According to IATA, the International Air Transport Association, in 2019, air cargo represented more than 35% of global trade by value, and world air cargo traffic is forecast to increase significantly over the next 20 years, with air freight projected to grow at an annual rate of 4.3%. The air cargo market has benefitted from the increase in e-commerce and the online sales of consumer goods. Consumer and commercial demand for commodities that can be shipped quickly, especially those to be delivered in one or two days or even less, has risen in recent years. The type and volume of goods handled through air cargo and freight facilities has increased, while transportation of letters has decreased. IATA notes that the handling, storage, and distribution of goods transported by air is being redefined, and this will impact cargo facilities. Many of the warehouses where the goods are packaged and processed to be shipped by air are fully automated and use technology including artificial intelligence and augmented reality to improve the efficiency with which goods are selected, packaged, and readied for shipment. At least one company has a warehouse where goods may be selected, packaged, and readied for shipment located at a major airport, and goods to be shipped may be loaded into containers and transferred directly onto aircraft without having to be transported to an airport freight handling facility.

Many warehouses and facilities that handle freight to be transported by air have been redesigned to incorporate developments in technology that increase the speed and accuracy with which the freight may be identified, sorted, packed into shipping containers, and labeled according to destination and other criteria. The shipping containers may be held at the warehouse or immediately transported to airport freight handling facilities. Although changes to improve the efficiency of airport cargo transfer have been proposed, the systems currently used move cargo between airport freight handling facilities or terminals and aircraft have not changed for many years, and advancements in technology adopted by goods handling warehouses and facilities have not been applied to move the goods onto aircraft. Consequently, the improvements in speed and efficiency with which goods to be shipped by air are readied for shipment have not been achieved in the transfer of this cargo between airport freight handling facilities and freight-carrying aircraft.

At most airports with dedicated freight handling facilities and freight aircraft, containers and pallets known as unit load devices (ULDs) arrive packed with goods to be transported by air. The ULDs allow a large quantity of goods, or, in some cases, smaller numbers of bulky goods, to be bundled into a single unit that may have a standard shape, which reduces the number of units to be loaded. Container ULDs that are designated ready to be loaded onto an aircraft may be loaded on wheeled platforms, typically connected together in a train, and moved from a freight handling facility at the airport to the aircraft that is to transport the designated ULDs. The ULDs must then be transferred at ground level to a loading device, usually a K-loader type of loading device. The K-loader, which may have room for up to three ULDs, is then raised to the level of a cargo door on the aircraft, and the ULDs are moved into the aircraft cargo hold. This process must be repeated until all of the ULDs to be loaded on that aircraft are in the aircraft cargo hold, which may require multiple K-loaders positioned at an aircraft or multiple trips between the freight terminal where the freight is located and a single K-loader at the aircraft. Some K-loaders are mobile and may be towed by tractors to move the ULDs directly between the freight handling facility and the aircraft.

Some aircraft, particularly larger freighter aircraft like the military C5 aircraft and the 747 freighter, have collapsing nose gear and/or noses that swing upward. The C5's collapsing nose gear permits loading of freight containers and other cargo from ground level, while cargo is towed on loaders to 747 freighter aircraft with upward-swinging noses. Other freight aircraft, such as 737 and A320 freighters, typically have a single wide freight door on the left or port side of the aircraft where ULD containers are loaded onto the aircraft using K-loaders as described above.

Arriving freight aircraft typically park at an airport freight terminal in a nose-in orientation, ULD containers packed with cargo are unloaded, usually onto K-loaders, and are then transferred to the freight terminal or other freight handling facility. Departing freight aircraft are loaded with designated ULD containers using the process described above, and the loaded freight aircraft can then depart with their cargo. The apron or ramp area around a busy airport freight terminal may be congested with K-loaders, tractors, trains of wheeled platforms, and ground personnel in addition to the freight aircraft. The multiple trips required to unload and load cargo from freight aircraft with K-loaders are not only inefficient and time-consuming, but the process poses risks of collisions and damage to aircraft, K-loaders and other freight-carrying vehicles, and to ground personnel handling freight operations. In addition, the currently used cargo transfer process may be slowed or stopped by adverse weather conditions.

A need exists for an airport freight and cargo transfer system and a cargo transfer process that transfers cargo packed in ULD containers between freight aircraft and airport freight handling facilities with improved efficiency and safety while minimizing risk of collisions and reducing requirements for ground personnel, and that may be conducted in all weather conditions.

SUMMARY OF THE INVENTION

It is an object of the present invention, therefore, to provide an airport freight and cargo transfer system that may be conducted in all weather conditions to transfer cargo packed in ULD containers between airport freight handling facilities and freight aircraft with improved efficiency and safety, a minimized risk of collisions, and with a reduced need for ground personnel than currently available freight transfer systems.

It is another object of the present invention to provide an airport freight and cargo transfer system that transfers ULDs directly between a freight handling facility and an aircraft cargo hold without using external ground level ULD transport vehicles and elevatable ULD loaders.

It is an additional object of the present invention to provide an enclosed freight transfer bridge configured to extend directly between an airport freight terminal and a cargo door of a freight aircraft parked in a nose-in orientation or in a parallel orientation to the freight-handling facility.

It is an additional object of the present invention to provide an enclosed ULD transfer bridge extending between an airport freight terminal and a cargo door of a freight aircraft that is designed to transfer ULDs automatically or manually in both directions directly between the freight terminal and the freight aircraft cargo hold.

It is a further object of the present invention to provide a ULD container conveyance assembly in an enclosed ULD transfer bridge that directly connects an airport freight terminal and a freight aircraft operable to move ULD containers into and out of the aircraft.

It is yet a further object of the present invention to provide a cargo transfer system for an airport freight terminal that enables freight aircraft equipped with landing gear wheel-mounted electric taxi drive systems to pull forward into a loading dock in the freight terminal or to drive in reverse and back into a loading dock in the freight terminal to transfer cargo directly into or out of an aircraft forward hold cargo door or directly into or out of an aft cargo hold door.

It is a still further object of the present invention to provide a safe and efficient method for transferring ULD containers in all weather conditions directly between an airport freight terminal and freight aircraft powered for ground movement by landing gear wheel-mounted electric taxi drive systems and between an airport freight terminal and freight aircraft powered for ground movement by aircraft engines.

In accordance with the aforesaid objects, a system and a method for safely and efficiently transferring cargo packed in ULD containers directly between an airport freight terminal and freight aircraft in all weather conditions is provided. An enclosed freight transfer bridge configured to extend directly between an airport freight terminal and a cargo door of a freight aircraft is provided. The enclosed freight transfer bridge is designed to transfer ULD containers during unloading and loading directly between the airport freight terminal and the aircraft cargo hold accessed by a main cargo door on a level with a freight staging area at the airport freight terminal. The configuration of the freight transfer bridge enables direct connection with a freight aircraft's main cargo door when the freight aircraft are parked in a nose-in orientation perpendicular to the freight terminal or when the freight aircraft are parked in a parallel orientation with a longest axis of the aircraft parallel to the freight terminal. The freight transfer bridge interior is sized to receive ULD containers and to move the ULDs through the freight transfer bridge in both load and unload directions into and out of one or more of the freight aircraft's cargo holds. The floor of the freight transfer bridge has a system designed to move ULDs in both a straight direction and around an angled corner. The ceiling of the freight transfer bridge supports an overhead ULD conveyance track assembly that may be activated to move ULD containers automatically through the enclosed freight transfer bridge. A method for transferring freight packed in ULDs directly between a freight aircraft and an airport freight handling facility that uses the enclosed foregoing freight transfer bridge to move the ULDs is also provided.

An additional embodiment of the present invention further provides a system and method for the direct transfer of freight from an airport freight terminal loading area into either an aircraft forward cargo hold door or an aircraft aft cargo hold door for aircraft that are powered for ground travel with landing gear wheel-mounted electric taxi drive systems and are able to maneuver flexibly with the electric taxi drive systems in both forward and reverse directions in an apron or ramp area. In this embodiment, aircraft are driven forward with the electric taxi drive systems to pull into the airport freight terminal, and a direct connection may be established between a loading dock and the aircraft forward cargo hold door. Alternatively, aircraft may be driven in reverse with the electric taxi drive systems to back into a loading area, and a direct connection may be established between a loading dock and the aircraft aft cargo hold door.

Additional objects and advantages will be apparent from the following description, claims, and drawings.

DESCRIPTION OF THE INVENTION

Figure 1A:
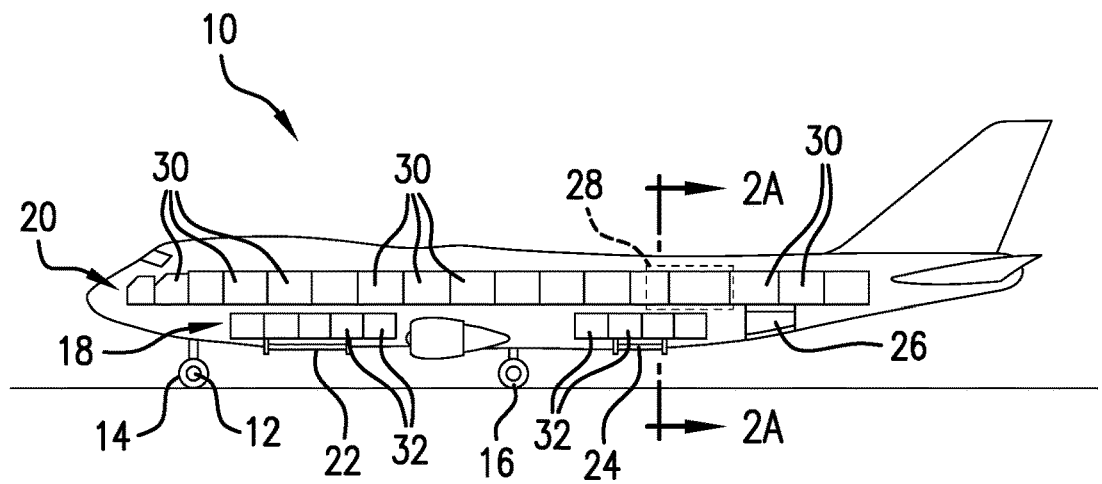
FIG. 1A is a diagrammatic side view of one type of freight aircraft configured to carry only cargo.

As discussed above, the increase in online commerce and expectations for next day and faster delivery of goods has produced an increase in the amount of cargo transported by air and the frequency with which these goods are transported to meet delivery expectations. Until relatively recently, freight aircraft flew primarily at night to ensure quick delivery; however, this has changed, and now freight aircraft fly all day as well as all night to satisfy customer expectations for rapid delivery. As discussed above, preparing goods for air transport is increasingly being done with automated systems and methods that use the latest technology. Once the goods to be transported by air reach an airport freight terminal, however, they are loaded on cargo aircraft using manual loading systems and methods in use for many decades. The freight and cargo transfer system and method of the present invention enables an airport to move cargo between freight terminals and freight aircraft more quickly and efficiently and with less labor than is possible with existing systems and methods.

The terms "cargo" and "freight" are used interchangeably herein to refer to consumer and commercial goods, materials, equipment, and the like that are transported by air from a provider or source of such goods. The term "freight aircraft," as used herein, describes aircraft commonly referred to as freighters that carry and transport only cargo and not passengers. An airport "cargo terminal," "freight terminal," or "freight-handling facility," as used herein, describes an airside facility that is typically a structure that may be separate from an airport's main or passenger terminal. Cargo from different sources, including cargo unloaded from arriving freight aircraft and cargo delivered by trucks, may be temporarily held in a freight terminal for loading on a departing freight aircraft.

A "ULD" or "unit load device," as used herein, refers to a container used to load a large number of items of cargo into a single unit for transport. A ULD typically has a configuration that is contoured, as shown in the drawings, to permit ULDs to fit within the typically rounded configuration of an aircraft cargo hold. The term ULD may also include a pallet; the system and method of the present invention are primarily directed to the transfer of cargo in ULD containers. The use of a manifest or packing list, which may be in electronic or other forms, allows the contents of ULDs to be tracked.

The freight aircraft described in connection with the present invention may advantageously be driven on the ground by electric taxi drive systems. "Electric taxi drive systems" and "electric taxi systems," as used herein, refer to pilot-controllable landing gear wheel-mounted drive systems used to drive aircraft independently of and without reliance on operation of aircraft main engines and tugs or external tow vehicles. Electric taxi drive systems may include landing gear wheel-mounted electric drive motors, gear or roller traction drive systems, clutches, and other components activatable to power landing gear wheels and drive the aircraft during ground travel in response to pilot control. An example of one electric taxi drive system developed by Applicant to drive an aircraft during ground travel without reliance on operation of the aircraft's main engines or attachment to tugs is described in commonly owned U.S. Pat. No. 10,308,352, the disclosure of which is fully incorporated herein in its entirety by reference. Other drive systems using drive motors that are not electric, including, for example, hydraulic or pneumatic drive motors, may also drive aircraft in connection with the airport freight and cargo transfer system and method of the present invention and are contemplated to be included within the terms "electric taxi drive systems." An electric taxi drive system may be mounted completely within a volume defined by walls of a landing gear wheel in one or more nose or main landing gear wheels. In a preferred embodiment, electric taxi drive systems are mounted completely within defined wheel wall volumes in both wheels of an aircraft nose landing gear and are controlled by a pilot or flight crew from the aircraft cockpit with controls designed to operate the electric taxi drive system, power the nose landing gear wheels, and drive the aircraft during ground travel without reliance on the aircraft's main engines and external assistance from tugs. While electric taxi drive systems may typically be powered by an aircraft auxiliary power unit, another source of electric power, for example batteries and solar or other power on the aircraft, may be used to power the electric taxi drive systems. Freight aircraft docked for freight transfer as described herein may also employ connections to ground power when necessary.

The freight aircraft described in connection with the present invention may also be driven on the ground conventionally with aircraft engines, although these aircraft will not be able to perform all of the aircraft maneuvers that can be performed by a freight aircraft driven with electric taxi drive systems.

Referring to the drawings, which may not be drawn to scale, FIG. 1A is a diagram showing a side partial cross-sectional view of a freight aircraft 10. This is an example of one type of aircraft used to carry only cargo and not passengers. It is contemplated that other types and models of dedicated freight aircraft may also be used in connection with the airport cargo transfer system and method of the present invention. As described herein, the aircraft 10 may be equipped with landing gear wheel-mounted electric taxi drive systems that move the aircraft on the ground without reliance on operating aircraft engines and tow vehicles. The aircraft 10 is shown with electric taxi drive systems 12 mounted within both nose landing gear wheels 14. Electric taxi drive systems may also, or alternatively, be mounted within one or more main landing gear wheels 16. Aircraft 10 has a cargo hold with two levels in which cargo may be loaded, a lower level 18 and an upper level 20. Other types of freight aircraft may have different cargo hold configurations, and this is not intended to be limiting.

Aircraft 10 also has one or more cargo doors that are positioned to provide access to each cargo level. A forward cargo door 22 and an aft cargo door 24 provide access to the lower cargo level 18. Aircraft 10 may also have an aft door 26 for bulk cargo. A main cargo door 28 may typically be located on the left side of the aircraft 10. The main cargo door 28 in aircraft 10 is located toward the rear of the aircraft. As noted, aircraft 10 is an example of only one type of freight aircraft, and cargo doors may be located in other locations on different aircraft. A main cargo door, for example, may be located in the forward section of the aircraft rather than in the aft section as shown in FIG. 1A.

The rectangular shapes 30 in the upper level 20 of the cargo hold represent ULD containers; not all of the ULDs 30 are labeled. The rectangular shapes 32 in the lower level 18 of the cargo hold also represent ULDs and may be containers or another kind of ULD, such as a pallet.

Figure 1B:
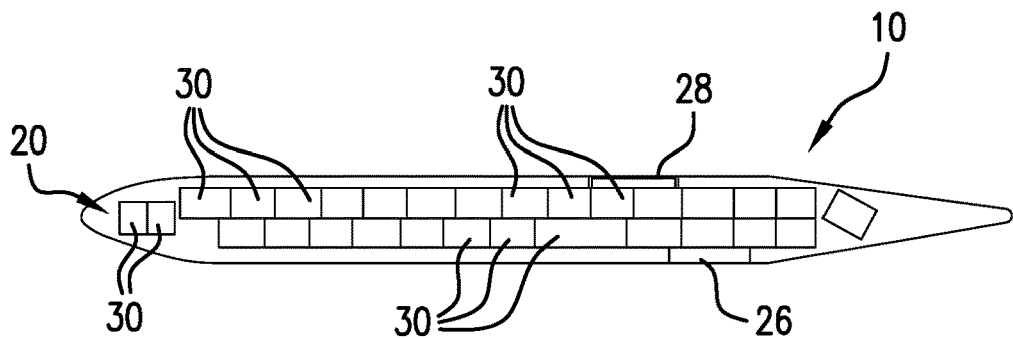
FIG. 1B is a diagrammatic top view of the cargo aircraft of FIG. 1A.

FIG. 1B shows a top diagrammatic view of the upper level 20 of the cargo hold of the aircraft 10 of FIG. 1A. The ULDs 30 are shown loaded in the cargo hold upper level 20 in two rows so that they may be packed as efficiently in the cargo hold as possible.

Figure 2A:
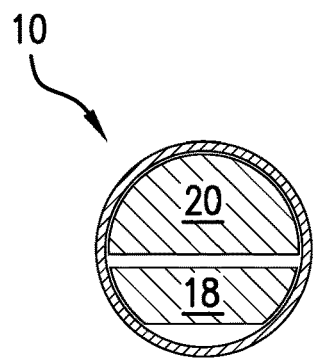
FIG. 2A is a diagrammatic cross-sectional view, taken along line 2A-2A in FIG. 1A, showing one possible configuration of cargo holds in the cargo aircraft of FIG. 1A.

FIG. 2A is a diagram of a cross-section of the fuselage of aircraft 10, taken along line 2A-2A in FIG. 1A, showing the lower level 18 and the upper level 20 of the cargo hold without ULDs 30 and 32 loaded in the cargo hold.

Figure 2B:
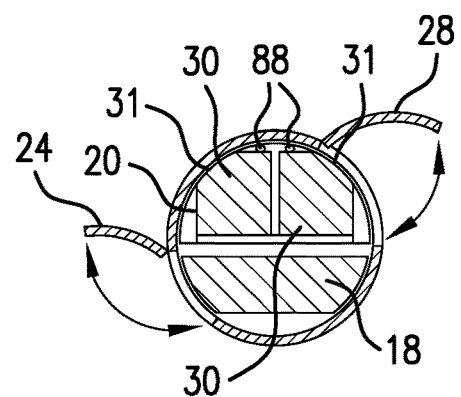
FIG. 2B shows a cross-sectional diagrammatic view of the cargo holds of FIG. 2A with cargo hold doors open and ULDs in an upper level cargo hold.

FIG. 2B illustrates the cross-sectional cargo hold view of FIG. 2A showing two container ULDs 30 in the upper level 20. The ULDs 30 each have a contoured angled side 31 that allows the ULDs to be constructed with a maximum volume that will fit within the substantially circular configuration of the aircraft fuselage. The main aft cargo door 28 is shown in an open position to provide access to the cargo hold upper level 20. A lower cargo door, the lower aft door 24, provides access to the cargo hold lower level 18. While main cargo doors are typically located on the left side of an aircraft, both the main cargo doors and the lower cargo doors may be located on either side of the aircraft.

Figure 3:
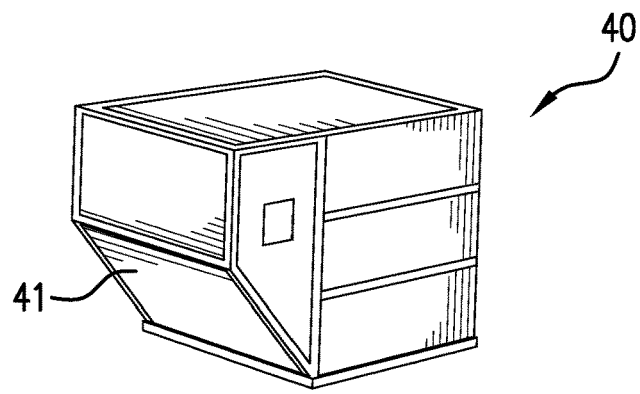
FIG. 3 is a diagrammatic perspective view of one kind of ULD container that may be used to contain cargo and loaded on a freight aircraft in accordance with the present invention.

FIG. 3 shows a configuration of one kind of ULD 40 that may be used to contain and transport a large number of individual goods to be loaded on an aircraft. The ULD 40 is a container with an overall contour that facilitates fitting it into an aircraft cargo hold. An aircraft fuselage is essentially a tube and, as discussed in connection with FIGS. 2A and 2B, has a substantially circular cross-sectional configuration. In the two level cargo hold described and shown in the aircraft 10 of FIGS. 1A and 1B, ULDs 30 packed in the cargo hold upper level 20 have a contoured angled side 31 that is positioned adjacent to a top of the fuselage that enables the ULDs 30 to fit within the circular cross-section portion of the fuselage adjacent to the upper level 20. FIG. 3 shows this contoured angled side in perspective view. The orientation of the ULD 40, with its contoured angled side 41 positioned as shown, will fit better in the fuselage cross-sectional configuration of the lower level 18 than in the upper level 20.

When a freight aircraft 10, which is equipped with landing gear wheel-mounted electric taxi drive systems to power ground travel, arrives at an airport to unload and load cargo, the aircraft 10 may be driven on the ground to the airport freight terminal with the electric taxi systems and maneuvered into a parking location. The ULDs 30 and 32 must be transferred from the cargo hold upper and lower levels (20, 18) to a freight staging area (not shown) at the freight terminal. At the present time, depending upon availability, K-loaders, which, as noted, have limited capacity, must be extended from ground level to a height of a cargo door (22, 24, 26, 28). A number of ULDs, usually one to three, are manually moved from the aircraft cargo hold through a cargo door to a K-loader. The K-loader is then lowered and moved, usually by tractor, to transfer the ULDs to the freight terminal. Unless multiple K-loaders are available, the original K-loader must return to the aircraft 10 and repeat this process until all of the ULDs (30, 32) have been unloaded from the aircraft. When all the arriving ULDs have been unloaded and transferred to the freight terminal, all of the departing ULDs to be transported by a departing freight aircraft 10 must be transferred, one to three at a time with K-loaders and loaded in the cargo hold upper or lower level before the aircraft 10 can take off. As noted, this process may be slowed or stopped in adverse weather conditions.

The present invention provides a system and a method that facilitates and streamlines the process of transferring ULD containers so that incoming cargo may be unloaded from freight aircraft and outgoing cargo may be loaded on freight aircraft quickly, efficiently, and safely in any weather conditions. The freight transfer system of the present invention provides an enclosed freight transfer bridge, or freightway, sized and structured to transfer ULD containers directly between an airport freight terminal and a freight aircraft. One end of the freightway may be connected to a staging area at the airport freight terminal at the level or height above the ground of a freight aircraft main cargo door, and the opposite end of the freightway is connected to the main cargo door on the freight aircraft. Since cargo doors on different kinds of freight aircraft may be located at different heights above the ground, it is contemplated that the freightway may be vertically adjustable to accommodate differences in freight aircraft cargo door heights. It is also contemplated that multiple freightways may be positioned at different levels at a freight terminal to provide connections with freight aircraft cargo doors located at corresponding different heights above the ground.

Figure 4:
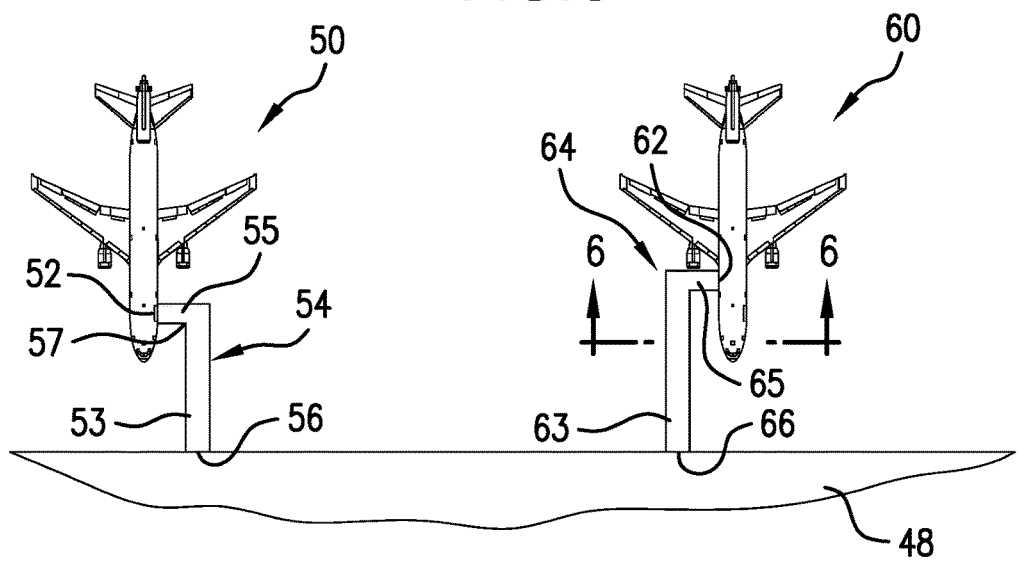
FIG. 4 is a diagram of an airport freight terminal showing freight aircraft parked at the terminal in a nose-in orientation and directly connected to the freight terminal with one embodiment of the enclosed freight transfer bridge of the present invention.

FIG. 4 shows one embodiment of configurations of freightways that may be used to provide a direct connection between an airport freight terminal and a single cargo door on a freight aircraft. A freightway may be provided for each aircraft parking location at the freight terminal. Freight aircraft 50 and 60 are parked in a nose-in orientation with a longest axis of the aircraft perpendicular to an airport freight terminal 48. A main cargo door 52 is located forward on the port or left side of the aircraft 50. A main cargo door 62 is located forward on the starboard or right side of aircraft 60. A freightway 54 extends from a connection 56 with the freight terminal 48 to the cargo door 52 on aircraft 50, and a freightway 64 extends from a connection 66 with the freight terminal 48 to the cargo door 62 on aircraft 60. As discussed above, advantageously, the freight terminal connections 56 and 66 are positioned at the same level above the ground surface as the cargo doors 52 and 62 to provide a level freight transfer surface. As noted above, the freightways 54 and 64 may be vertically adjustable. When aircraft are parked in the nose-in orientation shown, the freightways 54 and 64 will have a right angle configuration, with a major section (53, 63) of each freightway oriented perpendicular to the terminal 48 and a minor section (55, 65) forming a right angle with the major section and oriented parallel to the terminal 48 to provide a direct connection between the terminal 48 and the aircraft cargo hold through a cargo door (52 or 62). The direction of the right angle minor section (54, 64) of each freightway depends on whether the cargo door to be connected to the freightway is located on the right side (62) or on the left side (52) of the aircraft. The width dimensions of the freightways 54 and 64 may vary, as shown in FIG. 4, to accommodate different sizes of cargo doors (52, 62) on the aircraft 50 and 60, which may also be different sizes.

The freight aircraft 50 and 60 may be driven by electric taxi drive systems or aircraft engines to park in the nose-in parking locations at the freight terminal 48 shown in FIG. 4. The freightways 54 and 64, which may be permanently extended or retractable, are extended, if required, to connect the terminal locations 56 and 66 with the respective aircraft cargo doors (52, 62). ULD containers with cargo to be unloaded are moved from each aircraft through the freightways, as will be described in more detail below, directly to a cargo floor or staging area at the same level as the freightway in the terminal 48. Cargo in ULD containers to be loaded on each aircraft 50 and 60 may then be moved directly from the freight terminal locations (56, 66) through the freightways (54, 64) to the cargo doors ((52, 62) of the aircraft and into the cargo hold to be loaded in an upper cargo level or a lower cargo level, depending on the aircraft. When each aircraft (50, 60) has been loaded, the freightways (54, 64) may be disconnected from the cargo doors (52, 62) and moved away from the aircraft and/or retracted toward the freight terminal 48. The aircraft driven by electric taxi drive systems may be maneuvered by the electric taxi drive systems away from the terminal 48, by being driven in reverse with the electric taxi systems to a location where they may be turned to drive forward or, if there is sufficient space, by being driven forward to turn and drive out of the terminal parking location. The freightway configuration shown in FIG. 4 may also be used by freight aircraft driven with aircraft engines to park nose-in at freight terminals. When freight transfer has been completed, aircraft driven with engines must be pushed back from the freight terminal with tugs, which is more time consuming and cannot be done as quickly as aircraft can be maneuvered with electric taxi drive systems.

Figure 5:
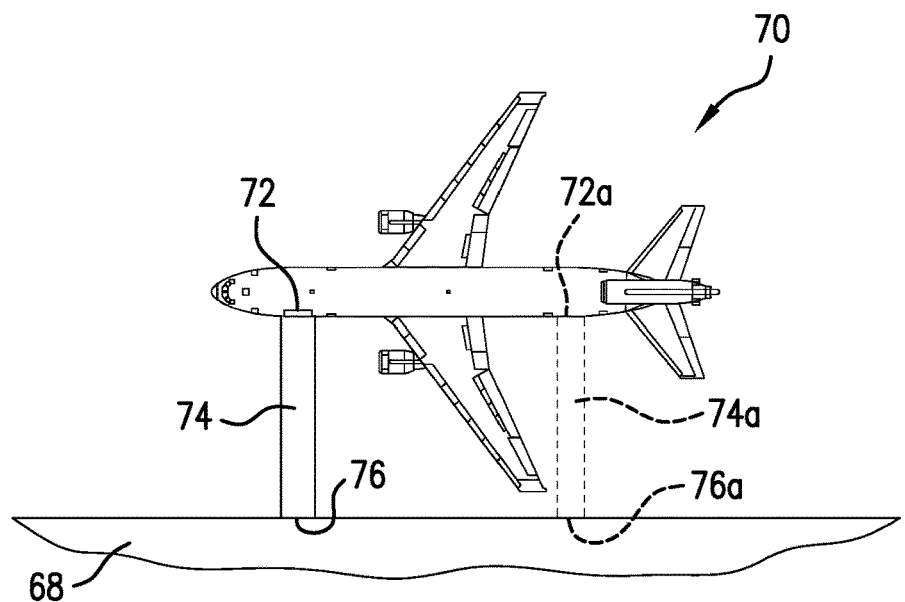
FIG. 5 is a diagram of an airport freight terminal showing a freight aircraft parked at the terminal in an orientation parallel to the freight terminal directly connected to the freight terminal with a second embodiment of the enclosed freight transfer bridge of the present invention.

FIG. 5 illustrates an aircraft 70 that is equipped with and has been driven by electric taxi systems to park at a freight terminal 68 in an orientation with the longest axis of the aircraft parallel to the terminal 68. A main cargo door 72 in a forward location on the port or left side of the freight aircraft 70 may be connected to a cargo transfer location 76 at the freight terminal 68. A freightway 74 provides a direct connection between the terminal cargo transfer location 76 and the forward main cargo door 72 on the freight aircraft 70. The configuration of the freightway 74 differs from that of the freightways 54 and 64 shown in FIG. 4 in that it has only a single major section perpendicular to the terminal 68. The parallel orientation of the aircraft 70 to the terminal does not require a right angle minor section for the freightway to provide the direct connection between the terminal and the cargo door 72. As indicated above, some aircraft have an aft main cargo door that is located toward the rear of the aircraft. In this case, the aircraft 70 will need to park at the freight terminal 68 so that the freightway, indicated in dashed lines at 74a, may be extended, if required, to connect directly with the aft main cargo door, indicated at 72a. The freight terminal cargo transfer location is indicated at 76a. It is contemplated that parallel freightways 74 and 74a may be used to provide simultaneous direct connections between a freight terminal and an aircraft that has both front and aft cargo doors. As noted above, the freightways 74 and 74a may be vertically adjustable or may be positioned at different levels to connect to cargo doors that are located at correspondingly different heights above the ground.

To park in the parallel orientation shown in FIG. 5, the aircraft 70 must be equipped with and driven on the ground by electric taxi drive systems. Jet blast and engine ingestion produced when aircraft are driven by operating engines to park close to a terminal in the parallel orientation shown present significant safety risks. Arriving freight aircraft equipped with electric taxi drive systems may be safely maneuvered into the parallel parking orientation shown in FIG. 5 without the risks associated with jet blast and engine ingestion to connect a freightway (74, 74a) with either a forward cargo door 72 or an aft cargo door 72a to provide a direct cargo transfer connection between the freight aircraft 70 and the freight terminal 68. ULD containers to be unloaded from the arriving freight aircraft may be transferred to the freight terminal through the freightway, and ULD containers to be loaded on a departing freight aircraft may be transferred from the freight terminal through the freightway. To enhance efficiency of cargo transfer when parallel freightways 74 and 74a are available for connection to the forward and aft cargo doors 72 and 72a, one of the freightways 74 or 74a may be designated to move cargo into the freight aircraft 70 and the other freightway 74 or 74a may be designated to move cargo out of the freight aircraft. When the loaded freight aircraft 70 is ready to depart, the pilot drives the aircraft forward with the electric taxi drive systems to turn and maneuver away from the freight terminal.

Figure 6:
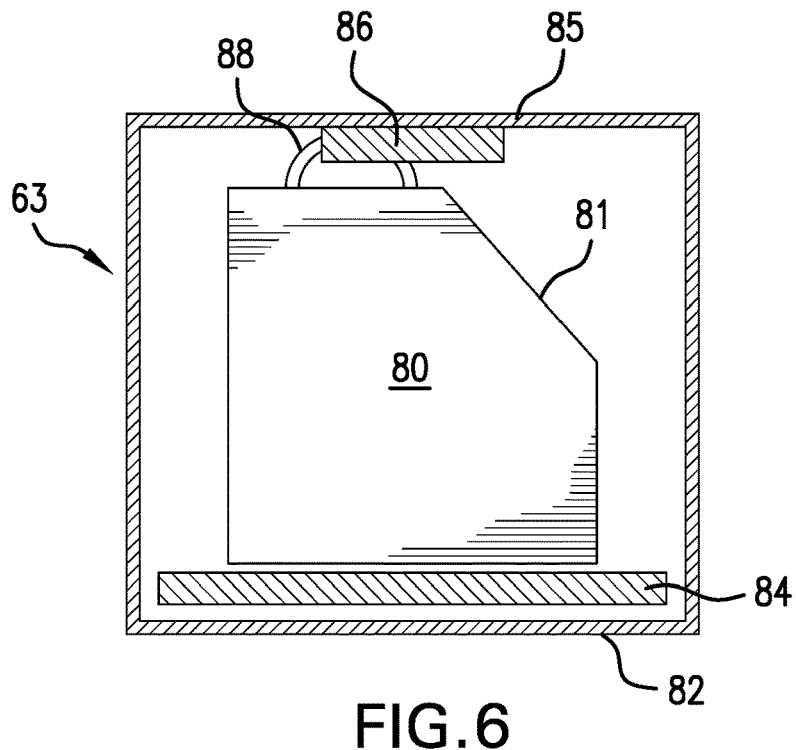
FIG. 6 is a diagram of a cross-sectional view, taken along line 6-6 in FIG. 4, of one section of the embodiment of the enclosed freight transfer bridge shown in FIG. 4.

FIG. 6 is a diagram of a cross-section of the major section 63 of an embodiment of the enclosed freightway 64, taken along line 6-6 in FIG. 4. This embodiment of the freightway may have a rectangular cross-sectional configuration that may be similar to the substantially square shape shown or may have different rectangular proportions. The freightway interior volume may be ideally sized to accommodate and move standard ULD containers within an enclosed space. A ULD container 80 having a contoured angled side 81 is shown supported above an interior floor section 82 of the freightway on a roller 84 in a roller track, described in connection with FIG. 7. An overhead ULD container conveyance track 86 may be attached to an interior ceiling section 85 of the freightway that is opposite the floor section 82. Each ULD container may be provided with a conveyance assembly attachment or connector 88, also seen in FIG. 2B, to connect the ULD container to the overhead conveyance track in the freightway. When the ULDs are connected to the overhead conveyance track 86, the ULD container conveyance track may be operated automatically to move ULDs through the freightway in opposite directions: from the freight aircraft cargo door through the freightway to the freight terminal connection location to unload ULDs from the aircraft, and from the freight terminal through the freightway to the aircraft cargo door to load ULDs on the freight aircraft. The diagrammatic configurations of the conveyance track and conveyance assembly connector shown in the drawings are merely illustrative; other configurations are contemplated to be within the scope of the present invention.

The ULD container overhead conveyance track 86 shown in FIGS. 2B and 6 may be designed to extend beyond the freightway into the freight aircraft cargo hold to facilitate automatic transfer of the ULD containers into and out of the cargo hold. It is contemplated that the freightway ULD container overhead conveyance track 86 may also be designed to extend beyond the freightway into the freight terminal (48, 68 in FIGS. 4 and 5) to facilitate automatic transfer of ULD containers from the terminal into the freightway and from the freightway into the terminal. It is also contemplated that the conveyance assembly attachment or connector 88 on each ULD container 80 may be automatically connected to the ULD container overhead conveyance track 86 at a freight terminal end and disconnected from the overhead conveyance track 86 at an aircraft end using robotics technology, artificial intelligence, and smart algorithms. The freightways described herein to be equipped for automatic conveyance of ULD containers will advantageously be positioned at the same level above the ground as the cargo terminal. ULD containers may also be moved manually by freight terminal personnel into and through the freightway on the freightway floor conveyance system without connection to the ULD container overhead conveyance track 86 to load and to unload the aircraft.

Figure 7:
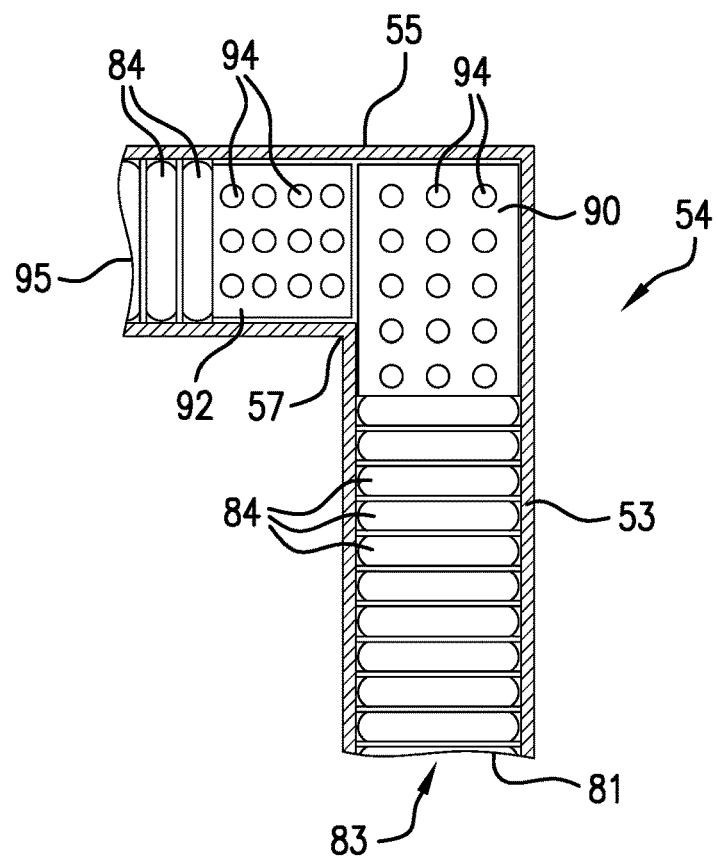
FIG. 7 is a diagrammatic top view of a ULD transfer mechanism in the floor of the freight transfer bridge shown in FIG. 4.

FIG. 7 is a diagram of a top view of one floor surface design in the freightway 54, shown in FIG. 4, that may be used to move ULDs through the enclosed freightway with and without the ULD container overhead conveyance track 86. The freightway 54 may be configured to be an extension of the aircraft onboard cargo conveyance surfaces currently used to transfer ULD containers between aircraft cargo holds and K loaders. These onboard aircraft conveyance surfaces are designed to enable linear movement and rotational movement so that ULD containers may be moved along a straight line path and also turned manually within the aircraft to position them in storage positions and locations, such as those shown in FIGS. 1A, 1B, 2A, and 2B.

The major section 53 of the freightway 54 may have a floor conveyance system 83 of multiple parallel rollers 84 that may be rotatably mounted so that they are spaced a convenient distance just above and parallel to the freightway floor (82 in FIG. 6). The floor conveyance system 83 with its multiple parallel rollers 84 may ideally extend from a freightway terminal connection end 81 to a point near the intersection 57 of the freightway major section 53 and the freightway right angle minor section 55. The ULD containers will move in a straight line path on the floor conveyance system 83 within the freightway major section 53. To facilitate movement of the ULDs around the 90° angle turn formed by the intersection of the freightway major section 53 and minor right angle section 55, one or more ball mats, such as ball mats 90 and 92, may be provided to form the floor conveyance system in this section of the freightway floor adjacent to the 90° angle turn at 57. Each ball mat 90, 92 supports multiple balls 94 so that they are free to rotate in multiple directions within their positions in the ball mat. This arrangement permits movement of the ULDs at an angle, such as around the 90° angle corner formed at the intersection 57 between the major freightway section 53 and the right angle minor section 55. Depending on the length of the freightway minor section 55, an additional section of multiple parallel rollers 84 may be provided between the ball mat 92 and the freightway aircraft attachment end 95. Other numbers and sizes of balls 94 than those shown in the ball mats 90 and 92 may be used in a ball mat suitable for moving ULDs along an angular path in a freightway in accordance with the present invention. It is contemplated that rotation of the rollers 84 and the balls 92 may be automated and controllable to further facilitate movement of the ULD containers through the freightway from the freight terminal to the aircraft cargo door and hold.

Each ULD entering the freight aircraft cargo hold from the freightways 54 and 64, which are perpendicular to the aircraft fuselage, will need to make a 90° angle turn to be transferred to the aircraft's onboard ULD container movement surface, and a ball mat is typically provided inside the aircraft for this. The freightway floor conveyance system aircraft attachment end 95, as indicated above, may be designed to connect with an aircraft cargo hold conveyance system so that ULDs may be moved smoothly between the freightway and the aircraft.

The freightways 74 and 74a shown in FIG. 5 connect directly to the cargo doors 72, 72a of the freight aircraft 70 parked in an orientation parallel to the terminal 68 without the need for the right angle sections required by the aircraft parked in the nose-in orientation shown in FIG. 4. The floors of the freightways 72, 72a may be equipped with only a floor conveyance system of multiple rollers, like the floor conveyance system 83 with the parallel rollers 84, as shown in the major section 53 of the freightway 54 of FIG. 7. The freightway ceilings 85 may be equipped with the ULD container overhead conveyance track 86 shown in FIG. 6. Both the floor conveyance system and the overhead conveyance track may, as described above, be automated, and ULD containers maybe moved automatically or manually through the freightways.

The freightways described above may be modified to provide a separate corridor along one side of the freightway (not shown) for the freight aircraft's crew to access the aircraft cockpit from a freight staging level of the freight terminal when the freightway is to be connected to a forward main cargo door. Connection of the modified freightway may require a precise alignment of the modified freightway with the freight aircraft to ensure that the separate corridor connects to an aircraft door with access to the cockpit.

With the present cargo transfer system and method, cargo in ULD containers may be moved directly between the freight terminal and the freight aircraft through the enclosed freightway without transporting the ULDs outside the freight terminal and without the use of ground service vehicles, K-loaders, and ground personnel. Not only may this process be accomplished efficiently and safely in any weather conditions, but it may be done without risk of collisions and other ground incidents associated with current ULD container transfer processes and with fewer ground personnel than are currently required.

Figure 8:
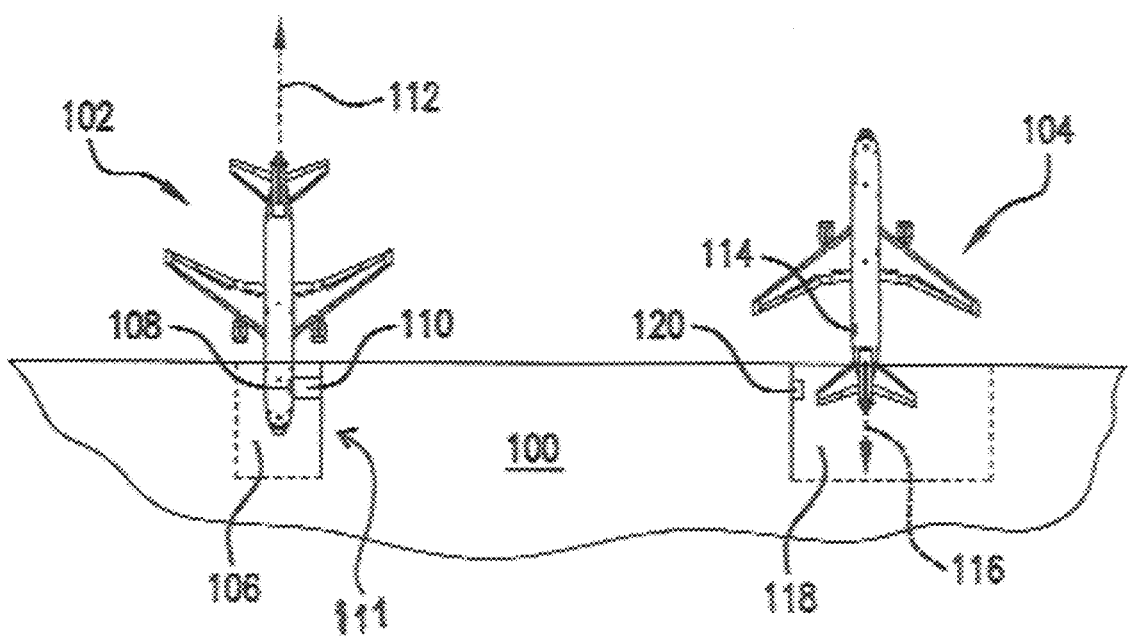
FIG. 8 is a schematic view of an additional embodiment of a freight transfer system and method according to the present invention for freight aircraft equipped with landing gear wheel-mounted electric taxi drive systems to power ground movement of the freight aircraft in forward and reverse directions into and out of a freight terminal to enable a direct connection between either a forward cargo hold door or an aft cargo hold door.

In an additional embodiment of a freight transfer system and method of the present invention, freight aircraft equipped with electric taxi drive systems may be maneuvered into and out of an airport freight terminal to connect directly with a loading dock or other loading structure inside the freight terminal so that cargo may be transferred directly to the freight aircraft inside the freight terminal. The aircraft maneuvers described in connection with FIG. 8 are possible when freight aircraft are equipped with landing gear wheel-mounted electric taxi drive systems for ground movement. Aircraft driven with operating engines cannot be safely maneuvered as described; jet blast and engine ingestion produced by operating engines prohibit their use to move freight aircraft inside a freight terminal. The freight aircraft may additionally be equipped with monitoring systems (not shown) that provide pilots driving the freight aircraft with views of the external ground area around the aircraft in real time as the freight aircraft is driven forward and in reverse with the electric taxi drive systems to dock directly with a freight terminal as described in connection with FIG. 8 or to connect with freightways as described above.

FIG. 8, which is not drawn to scale, schematically shows an airport freight terminal or freight warehouse 100 where two freight aircraft 102 and 104 have been maneuvered with the electric taxi drive systems into positions where a cargo hold of each freight aircraft may be connected directly with loading areas inside the freight terminal 100. The ability to drive freight aircraft and other aircraft equipped with electric taxi drive systems in both forward and reverse directions and to turn and maneuver them precisely with the electric taxi drive systems may also enable the freight aircraft 102 and 104 to be driven into the positions shown in FIG. 8. Freight aircraft 102 has been driven forward with the electric taxi drive systems to pull into a loading dock area 106 so that a forward cargo door 108 may be connected with a loading platform 110. The loading platform 110 and the adjacent loading dock floor 111 are advantageously level with the aircraft forward cargo door 108, which facilitates transfer of ULD containers and other cargo. Roller systems, such as those shown in FIG. 7 and described above, may already be provided on loading platforms and may be added to loading platform 110, if needed, for transfer of ULDs and the like. When cargo transfer has been completed, the freight aircraft 102 may activate the electric taxi drive systems and simply back the aircraft out of the loading dock area 106, such as along a path shown by arrow 112.

A freight aircraft 104 that has an aft cargo door 114 may be maneuvered with the electric taxi drive systems to turn after it has arrived at the freight terminal 100 so that the freight aircraft 104 is positioned as shown in FIG. 8. The freight aircraft 104 may then be driven in reverse with the electric taxi drive systems, such as along a path represented by arrow 116 to back into a loading dock area 118. The freight aircraft 104 may then further maneuver within the loading dock area 118 to directly connect the aft cargo door 114 with a loading platform 120. When the freight aircraft 104 has completed freight transfer through the aft cargo door 114 and is ready to depart the freight terminal, the pilot may simply drive the freight aircraft forward out of the loading dock area 118. Depending on the configuration of the loading dock area 118, the freight aircraft 104 may have to drive in reverse into a loading dock area that may be a more enclosed space than is shown in FIG. 8. In that event, a source of power for the electric taxi drive systems that is suitable for powering the electric taxi drive systems within an enclosed space may be provided.

The foregoing embodiment may require some modifications to freight terminals and freight warehouses to enable the freight aircraft to drive at least partly into the building so that direct connections may be made between loading docks and the aircraft forward and aft cargo doors. It is contemplated that new airport freight terminals and freight warehouses may be specifically constructed to enable freight aircraft powered by electric taxi drive systems to maneuver into the freight transfer locations shown in FIG. 8 and also into other efficient freight transfer locations in which the freight aircraft is positioned at least partially within these structures.

While the present invention has been described with respect to preferred embodiments, this is not intended to be limiting, and other arrangements and structures that perform the required functions are contemplated to be within the scope of the present invention.

INDUSTRIAL APPLICABILITY

The airport freight and cargo transfer system of the present invention will find its primary applicability at airports desiring to increase freight loading efficiency, to enhance safety of freight loading operations when freight is loaded by direct connections between a freight terminal and freight aircraft, and to reduce risks of collisions and ground incidents when the use of external freight loaders, ground service vehicles, and ground personnel is eliminated or reduced.

The invention claimed is:

1. An airport freight transfer system that directly transfers freight in unit load device (ULD) containers between dedicated freight aircraft and a dedicated airport freight terminal separate from said airport's main or passenger terminal, comprising:
   a. freight aircraft dedicated to transporting only freight and having within a fuselage of said freight aircraft cargo holds with upper and lower levels accessed by a plurality of cargo doors, including a main cargo door;
   b. a freight terminal separate from said airport's main or passenger terminal dedicated to holding and transferring freight to be transported by said freight aircraft, said freight terminal having a freight staging area located a distance above a ground surface where said dedicated freight aircraft park at said freight terminal;
   c. one or more enclosed freight transfer bridges connected to said freight staging area at heights above said ground surface corresponding to heights of said cargo doors above said ground surface, each said enclosed freight transfer bridge having a first end connected to said freight staging area and a second end removably connectable to one of said cargo doors to provide an enclosed direct freight transfer connection between said freight aircraft cargo holds and said freight staging area, and an interior of each said freight transfer bridge being sized and configured to accommodate and transfer ULD containers with a ULD container conveyance system supported by a floor portion of said enclosed freight transfer bridge and a ULD container transfer system supported by a ceiling portion of said enclosed freight transfer bridge; and
   d. a plurality of ULD containers holding freight and cargo to be transferred directly between said freight staging area and said freight aircraft cargo holds through said enclosed freight transfer bridges with said ULD container conveyance system and said ULD container transfer system, said ULD containers being constructed with a contoured configuration to have a maximum volume that fits within said freight aircraft cargo holds.

2. The system of claim 1, wherein said dedicated freight aircraft are equipped for ground movement with pilot-controllable landing gear wheel-mounted electric taxi drive systems to move said dedicated freight aircraft into parking orientations at said freight terminal.

3. The system of claim 1, wherein ground movement of said freight aircraft is controlled by operating aircraft engines.

4. The system of claim 1, wherein said one or more enclosed freight transfer bridges providing said direct freight transfer connection with said cargo doors on a dedicated freight aircraft parked in a nose-in orientation to said freight staging area are configured to have a first section extending perpendicularly from said first end to a second section extending at a right angle from said first section to said second end, said second end being vertically adjustable to form said enclosed direct freight transfer connection with a cargo door, and configurations of said ULD container conveyance system and said ULD container transfer system correspond to configurations of each said enclosed freight transfer bridge.

5. The system of claim 4, wherein said main cargo door is located on a right side or on a left side of said freight aircraft parked in said nose-in orientation and said enclosed freight transfer bridge second section is oriented to connect said second end to said main cargo door to form said enclosed direct freight transfer connection between said freight staging area and said cargo hold when said freight aircraft is parked in said nose-in orientation.

6. The system of claim 5, wherein said ULD container conveyance system in a said floor portion of said first section comprises a system of rotatably mounted parallel rollers supporting bottom surfaces of said ULD containers moved linearly within said first section, a ball mat with a plurality of balls rotatable in multiple directions supporting said bottom surfaces of said ULD containers moved through said right angle to said second section, and additional rotatably mounted parallel rollers supporting said ULD containers moved linearly to said second end.

7. The system of claim 6, wherein said ULD container transfer system comprises an overhead conveyance track supported by said enclosed freight transfer bridge ceiling portion to removably connectable with a conveyance track connector element on each said ULD container top surface.

8. The system of claim 7, wherein said ULD container transfer system is extendible beyond said second end of said enclosed freight transfer bridge into said cargo hold and beyond said first end of said enclosed freight transfer bridge into said freight staging area.

9. The system of claim 8, wherein said enclosed freight transfer bridge has a rectangular cross-section with an interior volume sized to accommodate and move said ULD containers within an enclosed space.

10. The system of claim 4, wherein said dedicated freight aircraft are equipped for ground movement with pilot-controllable landing gear wheel-mounted electric taxi drive systems to move said dedicated freight aircraft into a parking orientation at said freight terminal.

11. The system of claim 10, wherein said main cargo door on said freight aircraft is located in a forward portion of said freight aircraft or in an aft portion of said freight aircraft on a right side or on a left side of said freight aircraft, and said freight transfer bridge has a longitudinal configuration perpendicular to said freight terminal to form said enclosed direct freight transfer connection between said freight staging area and said cargo hold when said freight aircraft is parked at said freight terminal in a parallel orientation with a longest axis of said freight aircraft oriented parallel to said freight terminal.

12. The system of claim 11, wherein said container conveyance system in a floor portion of said freight transfer bridge comprises at least a system of rotatably mounted parallel rollers.

13. The system of claim 1, wherein said ULD containers are constructed with said contoured configuration and said maximum volume to fit within cross-sectional configurations of said dedicated freight aircraft fuselage cargo hold upper and lower levels, said contoured configuration comprising at least one angled side located on said ULD containers to permit said ULD containers to be loaded with said angled side adjacent to a top of said fuselage in said cargo hold upper level or located on said ULD containers to permit said ULD containers to be loaded with said angled side adjacent to a bottom of said fuselage in said cargo hold lower level.

* * * * *